United States Patent
Mossoba et al.

(10) Patent No.: US 11,361,352 B2
(45) Date of Patent: *Jun. 14, 2022

(54) METHOD, DEVICE, AND MEDIUM FOR UTILIZING MACHINE LEARNING AND TRANSACTION DATA TO MATCH BOYCOTTS OF MERCHANTS TO CUSTOMERS

(71) Applicant: Capital One Services, LLC, McLean, VA (US)

(72) Inventors: Michael Mossoba, Arlington, VA (US); Abdelkadar M'Hamed Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 198 days.

This patent is subject to a terminal disclaimer.

(21) Appl. No.: 16/828,097

(22) Filed: Mar. 24, 2020

(65) Prior Publication Data
US 2020/0380577 A1  Dec. 3, 2020

Related U.S. Application Data

(63) Continuation of application No. 16/425,116, filed on May 29, 2019, now Pat. No. 10,636,068.

(51) Int. Cl.
*G06Q 30/00* (2012.01)
*G06Q 30/06* (2012.01)

(52) U.S. Cl.
CPC ..... *G06Q 30/0609* (2013.01); *G06Q 30/0617* (2013.01)

(58) Field of Classification Search
CPC ............ G06Q 30/0609; G06Q 30/0617
USPC .................................. 705/26.1–27.2
See application file for complete search history.

(56) References Cited

U.S. PATENT DOCUMENTS

| | | |
|---|---|---|
| 2013/0232030 A1 | 9/2013 | Gockeler et al. |
| 2015/0142595 A1 | 5/2015 | Acuña-Rohter |

OTHER PUBLICATIONS

Ethical app gives users the choice to 'Buycott', May 15, 2013, Telegraph Media Group Limited (Year: 2013).*
Co-pending U.S. Appl. No. 16/425,116, filed May 29, 2019.
Ethical  app  gives users the choice to 'Buycott', May 15, 2013,  Telegraph Media Group Limited  Year: 2013.

* cited by examiner

*Primary Examiner* — Anand Loharikar
(74) *Attorney, Agent, or Firm* — Harrity & Harrity, LLP

(57) ABSTRACT

A device receives third-party boycott data associated with a merchant, and receives customer preference data associated with a customer of the merchant. The device processes the third-party boycott data and the customer preference data, with a machine learning model, to identify a boycott of the merchant that is predicted to be of interest to the customer. The device provides, to a user device of the customer, information identifying the boycott of the merchant and information that solicits the customer to indicate whether the customer desires to join the boycott, and receives, from the user device, information indicating that the customer desires to join the boycott. The device causes a transaction account associated with the customer to be restricted from a transaction with the merchant when the information indicates that the customer desires to join the boycott.

20 Claims, 14 Drawing Sheets

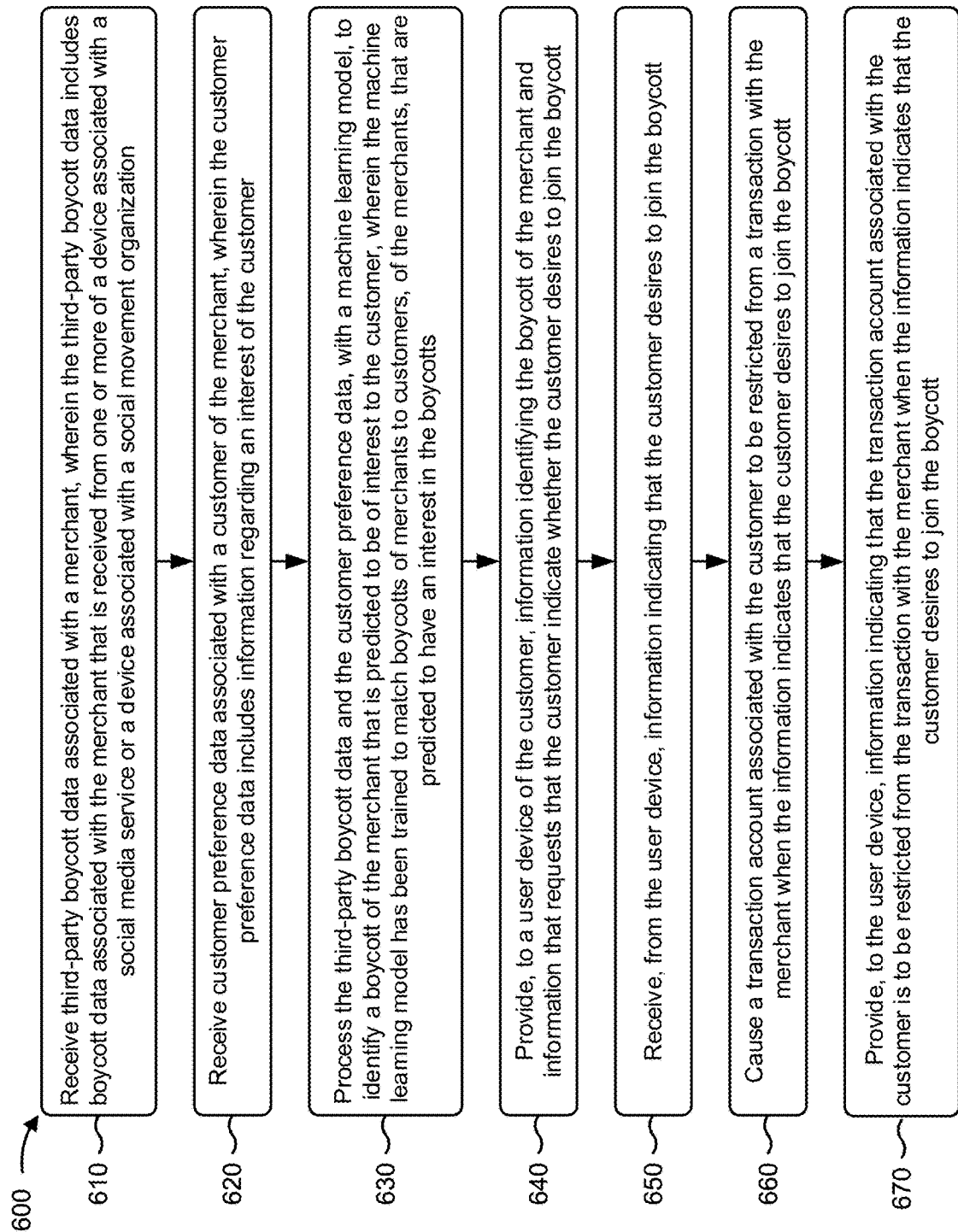

METHOD, DEVICE, AND MEDIUM FOR UTILIZING MACHINE LEARNING AND TRANSACTION DATA TO MATCH BOYCOTTS OF MERCHANTS TO CUSTOMERS

RELATED APPLICATION

This application is a continuation of U.S. patent application Ser. No. 16/425,116, filed May 29, 2019, which is incorporated herein by reference.

BACKGROUND

A boycott is an act of voluntary and intentional abstention from using, buying, and/or dealing with a person, an organization (e.g., a merchant), or a country as an expression of protest, usually for moral, social, political, and/or environmental reasons. The purpose of a boycott is to inflict some economic loss on a target (e.g., a person, an organization, or a country), or to indicate a moral outrage, to try to compel the target to alter an objectionable behavior.

SUMMARY

According to some implementations, a method may include receiving third-party boycott data associated with a merchant, wherein the third-party boycott data may include boycott data associated with the merchant that is received from one or more of a device associated with a social media service or a device associated with a social movement organization. The method may include receiving customer preference data associated with a customer of the merchant, wherein the customer preference data may include information regarding an existing relationship between the customer and the merchant and information regarding interests of the customer. The method may include processing the third-party boycott data and the customer preference data, with a machine learning model, to identify a boycott of the merchant that is predicted to be of interest to the customer, wherein the machine learning model may have been trained to match boycotts of merchants to customers, of the merchants, that are predicted to have an interest in the boycotts. The method may include providing, to a user device of the customer, information identifying the boycott of the merchant and information that solicits the customer to indicate whether the customer desires to join the boycott, and receiving, from the user device, information indicating that the customer desires to join the boycott. The method may include causing a transaction account associated with the customer to be restricted from a transaction with the merchant when the information indicates that the customer desires to join the boycott.

According to some implementations, a device may include one or more memories; and one or more processors, communicatively coupled to the one or more memories, to receive third-party boycott data associated with a merchant, wherein the third-party boycott data may include boycott data associated with the merchant that is received from one or more of a device associated with a social media service or a device associated with a social movement organization. The one or more processors may receive customer preference data associated with a customer of the merchant, wherein the customer preference data may include information regarding an interest of the customer, and may train a machine learning model to match boycotts of merchants to customers, of the merchants, that are predicted to have an interest in the boycotts. The one or more processors may process the third-party boycott data and the customer preference data, with the machine learning model, to identify a boycott of the merchant that is predicted to be of interest to the customer, and may provide, to a user device of the customer, information identifying the boycott of the merchant and information that requests that the customer indicate whether the customer desires to join the boycott. The one or more processors may receive, from the user device, information indicating that the customer desires to join the boycott, and may cause a transaction account associated with the customer to be restricted from a transaction with the merchant when the information indicates that the customer desires to join the boycott.

According to some implementations, a non-transitory computer-readable medium may store instructions that include one or more instructions that, when executed by one or more processors of a device, may cause the one or more processors to receive third-party boycott data associated with a merchant, wherein the third-party boycott data may include boycott data associated with the merchant that is received from one or more of a device associated with a social media service or a device associated with a social movement organization. The one or more instructions may cause the one or more processors to receive customer preference data associated with a customer of the merchant, wherein the customer preference data may include information regarding an interest of the customer. The one or more instructions may cause the one or more processors to process the third-party boycott data and the customer preference data, with a machine learning model, to identify a boycott of the merchant that is predicted to be of interest to the customer, wherein the machine learning model may have been trained to match boycotts of merchants to customers, of the merchants, that are predicted to have an interest in the boycotts. The one or more instructions may cause the one or more processors to provide, to a user device of the customer, information identifying the boycott of the merchant and information that requests that the customer indicate whether the customer desires to join the boycott, and receive, from the user device, information indicating that the customer desires to join the boycott. The one or more instructions may cause the one or more processors to cause a transaction account associated with the customer to be restricted from a transaction with the merchant when the information indicates that the customer desires to join the boycott, and provide, to the user device, information indicating that the transaction account associated with the customer is to be restricted from the transaction with the merchant when the information indicates that the customer desires to join the boycott.

BRIEF DESCRIPTION OF THE DRAWINGS

FIGS. 4-6 are flow charts of example processes for utilizing machine learning and transaction data to determine an aggregate effect of a boycott on a merchant.

DETAILED DESCRIPTION

Figure 1A:
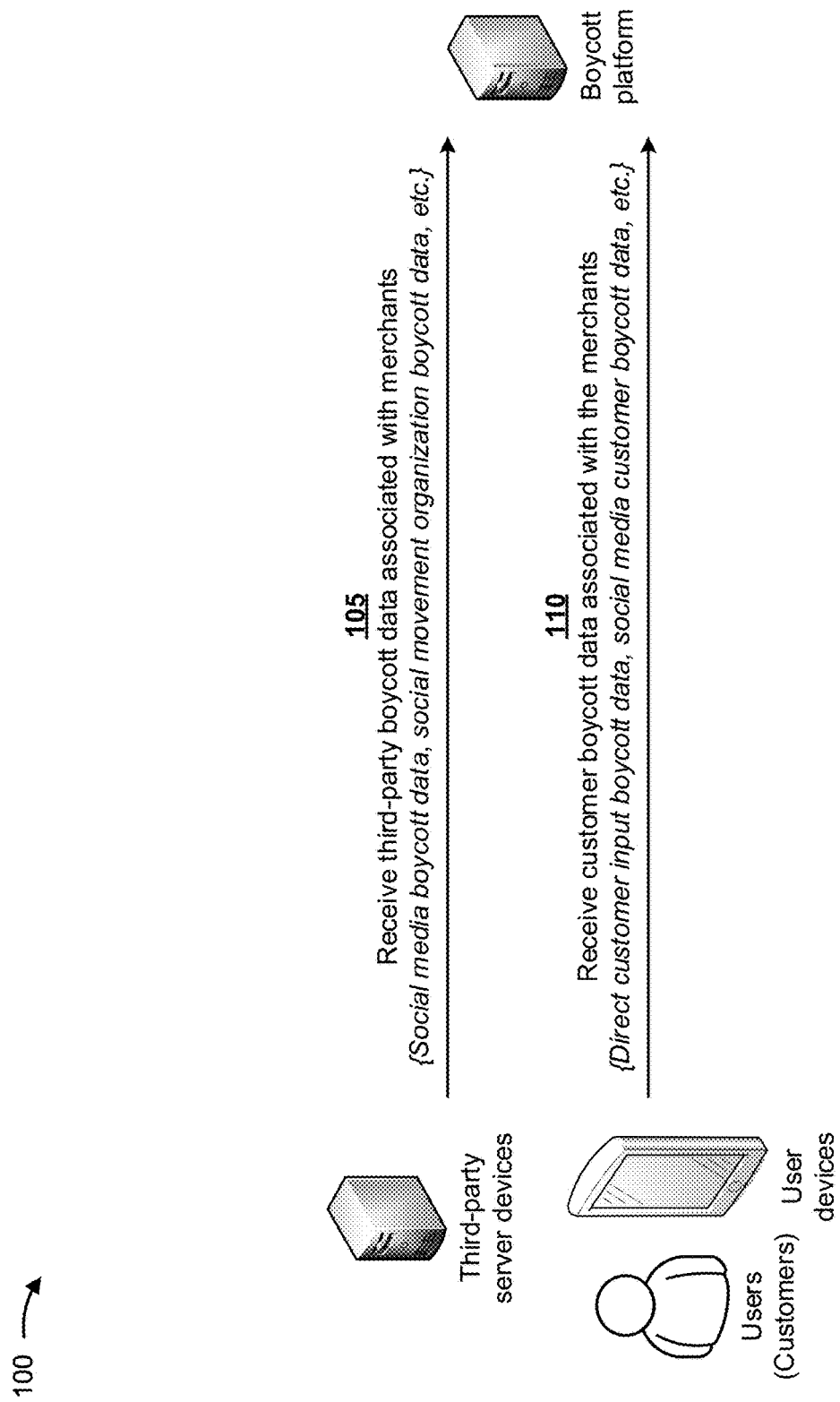
FIGS. 1A-1I are diagrams of one or more example implementations described herein.

The following detailed description of example implementations refers to the accompanying drawings. The same reference numbers in different drawings may identify the same or similar elements.

A boycott of a product or service of a merchant may be successful if enough customers join in the boycott of the product or service. However, many boycotts fail since the boycotts are not adequately communicated to customers. Thus, customers waste resources (e.g., processing resources, memory resources, network resources, transportation resources, and/or the like) joining boycotts that ultimately fail. If a boycott of a product or service of a merchant is successful, the merchant may not realize the product or service is being boycotted until significant resources (e.g., processing resources, memory resources, network resources, manufacturing resources, transportation resources, and/or the like) of the merchant are wasted producing and promoting the product or service.

Some implementations described herein provide a boycott platform that utilizes machine learning and transaction data to determine an aggregate effect of a boycott on a merchant. For example, the boycott platform may receive third-party boycott data associated with a merchant, where the third-party boycott data may include boycott data associated with the merchant that is received from a device associated with a social media service or a device associated with a social movement organization. The boycott platform may receive customer preference data associated with a customer of the merchant, where the customer preference data may include information regarding an existing relationship between the customer and the merchant and information regarding interests of the customer. The boycott platform may process the third-party boycott data and the customer preference data, with a machine learning model, to identify a boycott of the merchant that is predicted to be of interest to the customer, where the machine learning model has been trained to match boycotts of merchants to customers, of the merchants, that are predicted to have an interest in the boycotts. The boycott platform may provide, to a user device of the customer, information identifying the boycott of the merchant and information that solicits the customer to indicate whether the customer desires to join the boycott, and may receive, from the user device, information indicating that the customer desires to join the boycott. The boycott platform may cause a transaction account associated with the customer to be restricted from a transaction with the merchant when the information indicates that the customer desires to join the boycott.

In this way, the boycott platform enables customers and a merchant to determine whether a boycott will be successful or fail before wasting additional resources (e.g., processing resources, memory resources, network resources, manufacturing resources, transportation resources, and/or the like). The customers will commit resources to the boycott when the boycott appears to be successful and/or gaining in popularity. The merchant will not waste additional resources producing and/or promoting a product or service that is being successfully boycotted by the customers.

FIGS. 1A-1I are diagrams of one or more example implementations 100 described herein. As shown in FIG. 1A, user devices and third-party server devices may be associated with a boycott platform. As further shown, the user devices may be associated with users (e.g., customers of merchants that are subject to boycotts). In some implementations, the customers may boycott one or more services of the merchants, one or more products of the merchants, and/or the like. The third-party server devices may be associated with social media services, social movement organizations, and or the like.

As further shown in FIG. 1A, and by reference number 105, the boycott platform may receive, from the third-party server devices, third-party boycott data associated with the merchants. In some implementations, the third-party boycott data may include social media boycott data (e.g., data identifying boycotts of the merchants on social media websites, blogs, news websites, and/or the like), social movement organization boycott data (e.g., data identifying boycotts of the merchants on websites associated with social movement organizations, news websites, and/or the like), and/or the like. The third-party boycott data may be received based on monitoring social media for the social media boycott data, may be received from specific customers, social movement organizations, and/or the like, may be received from the Internet, and/or the like.

In some implementations, the boycott platform may actively monitor social media websites (e.g., Facebook, Twitter, and/or the like) for posts relating to products and/or services of an organization (e.g., a merchant), websites directed just to boycotts and that may include information indicating a boycott of the products and/or services. The monitoring of the social media websites may include the boycott platform performing one or more searches periodically (e.g., hourly, daily, weekly, and/or the like) for information being posted about the products and/or services, and determining whether the posts are positive or negative. If posts are negative, the boycott platform may determine whether a quantity and content of the negative posts are reflective of a boycott. For example, the boycott platform may perform a query that includes the word "boycott." The boycott platform may determine whether the quantity of negative posts satisfy a threshold quantity (e.g., a particular number of people providing negative posts) to be reflective of a boycott. In some implementations, the boycott platform may utilize a machine learning model, as described below, to determine whether posts are positive or negative and to determine whether a quantity and content of negative posts are reflective of a boycott.

In some implementations, the boycott platform may periodically receive the third-party boycott data from the third-party server devices, may continuously receive the third-party boycott data from the third-party server devices, and/or the like. In some implementations, the boycott platform may store the third-party boycott data in a data structure (e.g., a database, a table, a list, and/or the like) associated with the boycott platform.

As further shown in FIG. 1A, and by reference number 110, the boycott platform may receive, from the user devices, customer boycott data associated with the merchants. In some implementations, the customer boycott data may include direct customer input boycott data (e.g., data identifying boycotts of the merchants that is input by the customers via the user devices), social media customer boycott data (e.g., data identifying boycotts of the merchants on social media accounts of the customers, blogs of the customers, and/or the like), and/or the like. In some implementations, the boycott platform may periodically receive the customer boycott data from the user devices, may continuously receive the customer boycott data from the user devices, and/or the like. In some implementations, the boycott platform may store the customer boycott data in a data structure (e.g., a database, a table, a list, and/or the like) associated with the boycott platform. In some implementations, the boycott platform may collect, store, and use personal information provided by individuals in accordance with all applicable laws concerning protection of personal information. Additionally, the collection, storage, and use of personal information may be subject to consent of the individual to such activity (e.g., via "opt-in" or "opt-out" processes as may be appropriate for the situation and type of information).

Figure 1B:
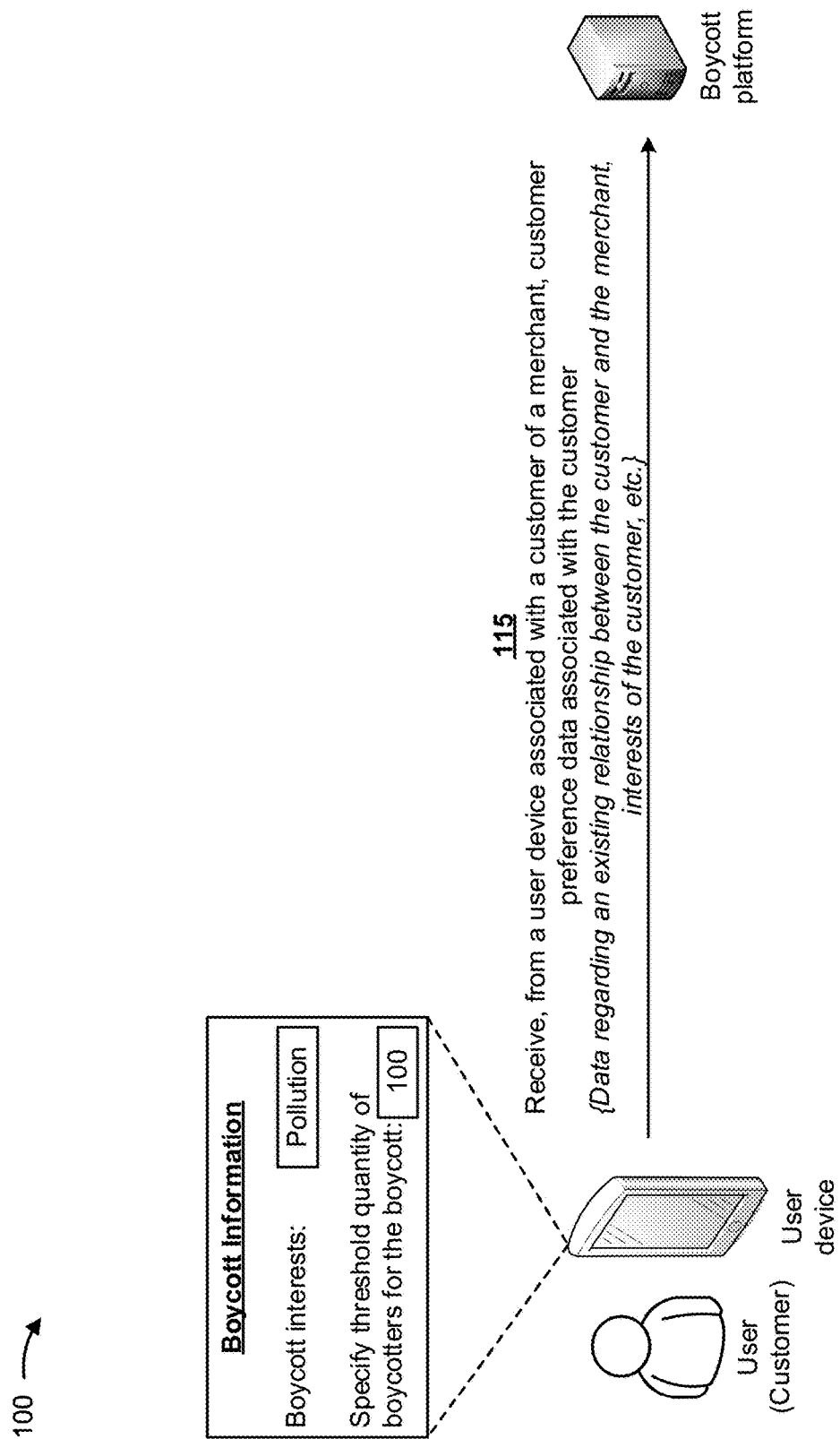

As shown in FIG. 1B, and by reference number 115, the boycott platform may receive, from a user device associated with a customer of a merchant, customer preference data associated with the customer. The user device may be one of the user devices, the customer may be one of the customers, and the merchant may be one of the merchants. In some implementations, the customer preference data may include data identifying an existing relationship between the customer and the merchant (e.g., data identifying a quantity of purchases made by the customer from the merchant over a time period, whether the customer is a rewards member of the merchant, a quantity of times the customer has utilized a web site of the merchant, and/or the like); data identifying interests of the customer (e.g., data indicating that the customer is interested in reducing pollution, preserving nature, changing social structures, changing economic conditions, and/or the like; data indicating boycotts in which the customer is interested, threshold quantities of boycotters required to join a boycott, and/or the like); data indicating that the customer wishes to opt out of a particular boycott; data indicating that the customer wishes to mute updates for boycotts that are no longer of interest to the customer; and/or the like.

In some implementations, the boycott platform may periodically receive the customer preference data from user devices associated with customers, may continuously receive the customer preference data from the user devices, and/or the like. In some implementations, the boycott platform may store the customer preference data in a data structure (e.g., a database, a table, a list, and/or the like) associated with the boycott platform. Although FIGS. 1A and 1B show specific quantities of third-party server devices, user devices, and/or the like, in some implementations, the boycott platform may be associated with more third-party server devices, user devices, and/or the like than depicted in FIGS. 1A and 1B. For example, the boycott platform may include hundreds, thousands, and/or the like of third-party server devices, user devices, and/or the like that generate thousands, millions, billions, etc. of data points. In this way, the boycott platform may handle thousands, millions, billions, etc., of data points within a time period, and thus may provide "big data" capability.

Figure 1C:
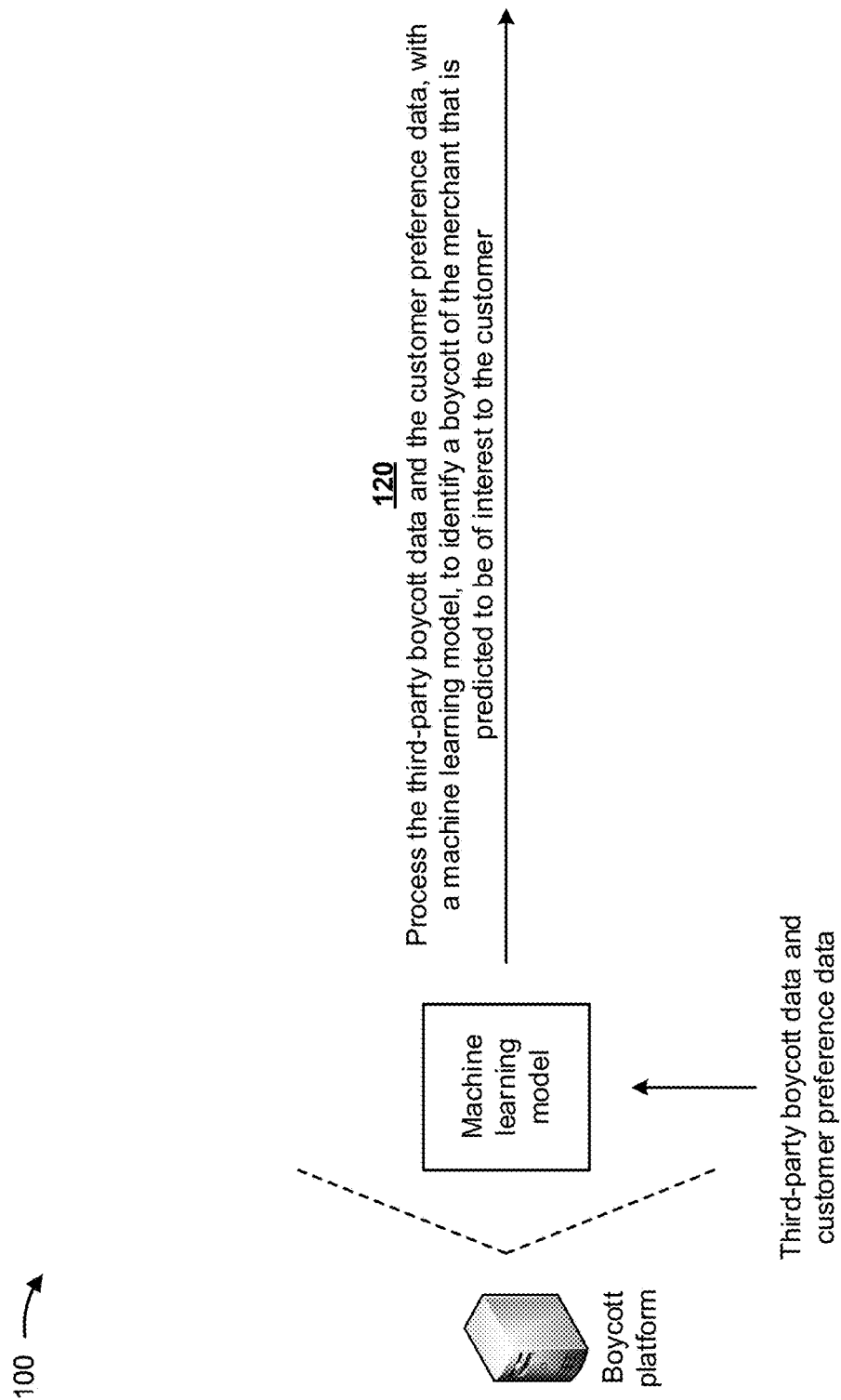

As shown in FIG. 1C, and by reference number 120, the boycott platform may process the third-party boycott data and the customer preference data, with the machine learning model, to identify a boycott of the merchant that is predicted to be of interest to the customer. In some implementations, the machine learning model may be trained to match boycotts of merchants to customers, of the merchants, that are predicted to have an interest in the boycotts.

In some implementations, the boycott platform may train the machine learning model, with historical third-party boycott data and historical customer preference data, to identify a boycott of the merchant that is predicted to be of interest to the customer. For example, the boycott platform may separate the historical third-party boycott data and historical customer preference data into a training set, a validation set, a test set, and/or the like. The training set may be utilized to train the machine learning model. The validation set may be utilized to validate results of the trained machine learning model. The test set may be utilized to test operation of the machine learning model.

In some implementations, the boycott platform may train the machine learning model using, for example, an unsupervised training procedure and based on the historical third-party boycott data and historical customer preference data. For example, the boycott platform may perform dimensionality reduction to reduce the historical third-party boycott data and the historical customer preference data to a minimum feature set, thereby reducing resources (e.g., processing resources, memory resources, and/or the like) to train the machine learning model, and may apply a classification technique to the minimum feature set.

In some implementations, the boycott platform may use a logistic regression classification technique to determine a categorical outcome (e.g., that the historical third-party boycott data and the historical customer preference data are associated with a boycott of the merchant that is predicted to be of interest to a customer). Additionally, or alternatively, the boycott platform may use a naïve Bayesian classifier technique. In this case, the boycott platform may perform binary recursive partitioning to split the historical third-party boycott data and the historical customer preference data into partitions and/or branches and use the partitions and/or branches to determine outcomes (e.g., that the historical third-party boycott data and historical customer preference data are associated with a boycott of the merchant that is predicted to be of interest to a customer). Based on using recursive partitioning, the boycott platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the boycott platform may use a support vector machine (SVM) classifier technique to generate a non-linear boundary between data points in the training set. In this case, the non-linear boundary is used to classify test data into a particular class.

Additionally, or alternatively, the boycott platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the boycott platform may use one or more other model training techniques, such as a neural network technique, a latent semantic indexing technique, and/or the like. For example, the boycott platform may perform an artificial neural network processing technique (e.g., using a two-layer feedforward neural network architecture, a three-layer feedforward neural network architecture, and/or the like) to perform pattern recognition with regard to patterns of the historical third-party boycott data and the historical customer preference data. In this case, using the artificial neural network processing technique may improve an accuracy of the trained machine learning model generated by the boycott platform by being more robust to noisy, imprecise, or incomplete data, and by enabling the boycott platform to detect patterns and/or trends undetectable to human analysts or systems using less complex techniques.

Figure 1D:
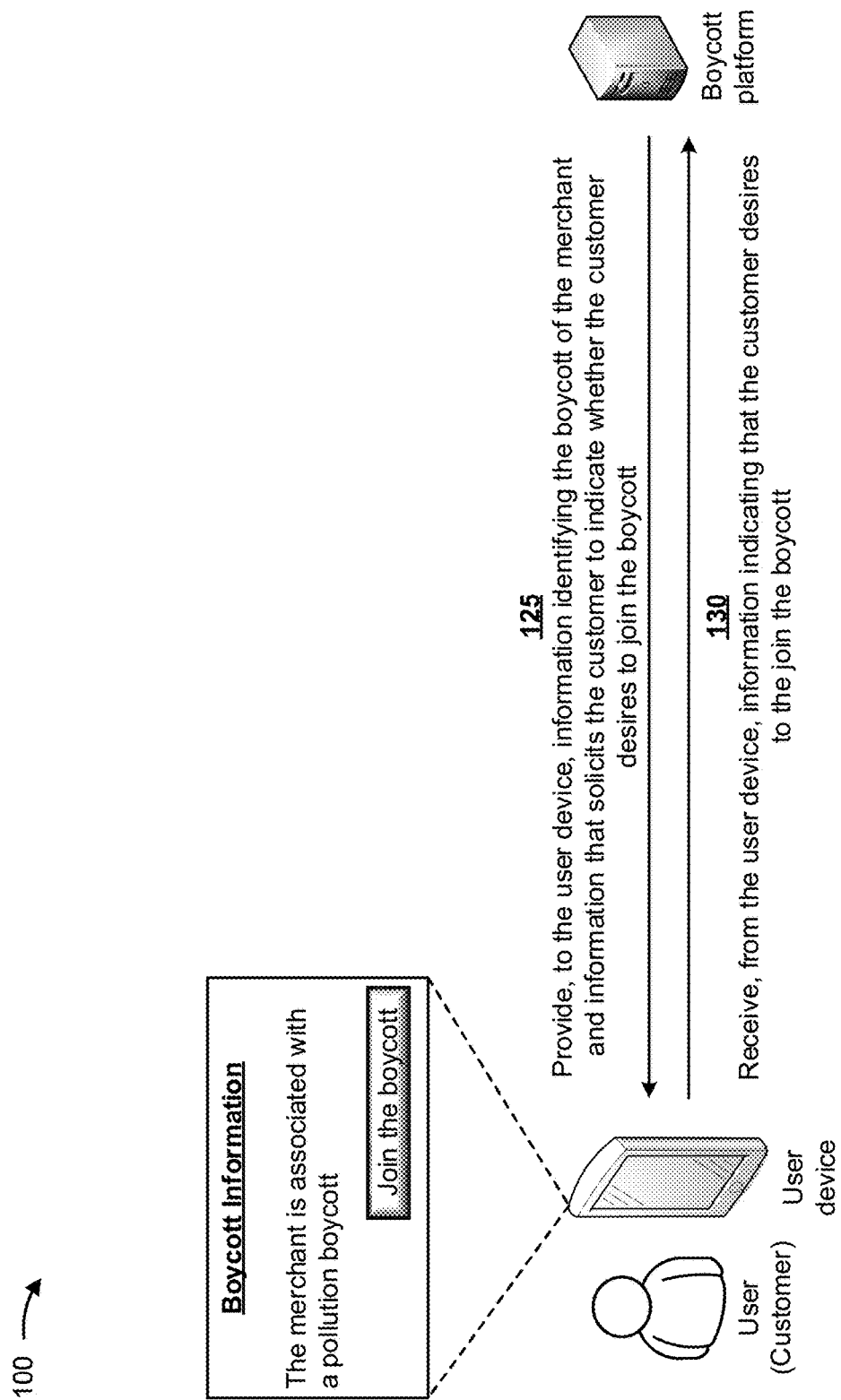

As shown in FIG. 1D, and by reference number 125, the boycott platform may provide, to the user device, information identifying a boycott of the merchant and information that solicits the customer to indicate whether the customer desires to join the boycott. In some implementations, the user device may receive the information identifying the boycott and the information that solicits the customer to indicate whether the customer desires to join the boycott, and may provide the received information for display to the customer via a user interface. For example, as shown in FIG. 1D, the user device may display a user interface that includes information indicating that the merchant is associated with a pollution boycott and that includes a selection mechanism (e.g., a button, a link, an icon, and/or the like) that enables the customer to join the pollution boycott. The customer may utilize the user interface to select the selection mechanism in order to indicate that the customer desires to join the pollution boycott associated with the merchant.

As further shown in FIG. 1D, and by reference number 130, the boycott platform may receive, from the user device and based on the customer selecting the selection mechanism, information indicating that the customer desires to join the boycott associated with the merchant. For example, the boycott platform may receive information identifying the customer, the merchant, the pollution boycott, and/or the like; information indicating that the customer desires to join the pollution boycott; and/or the like.

Figure 1E:
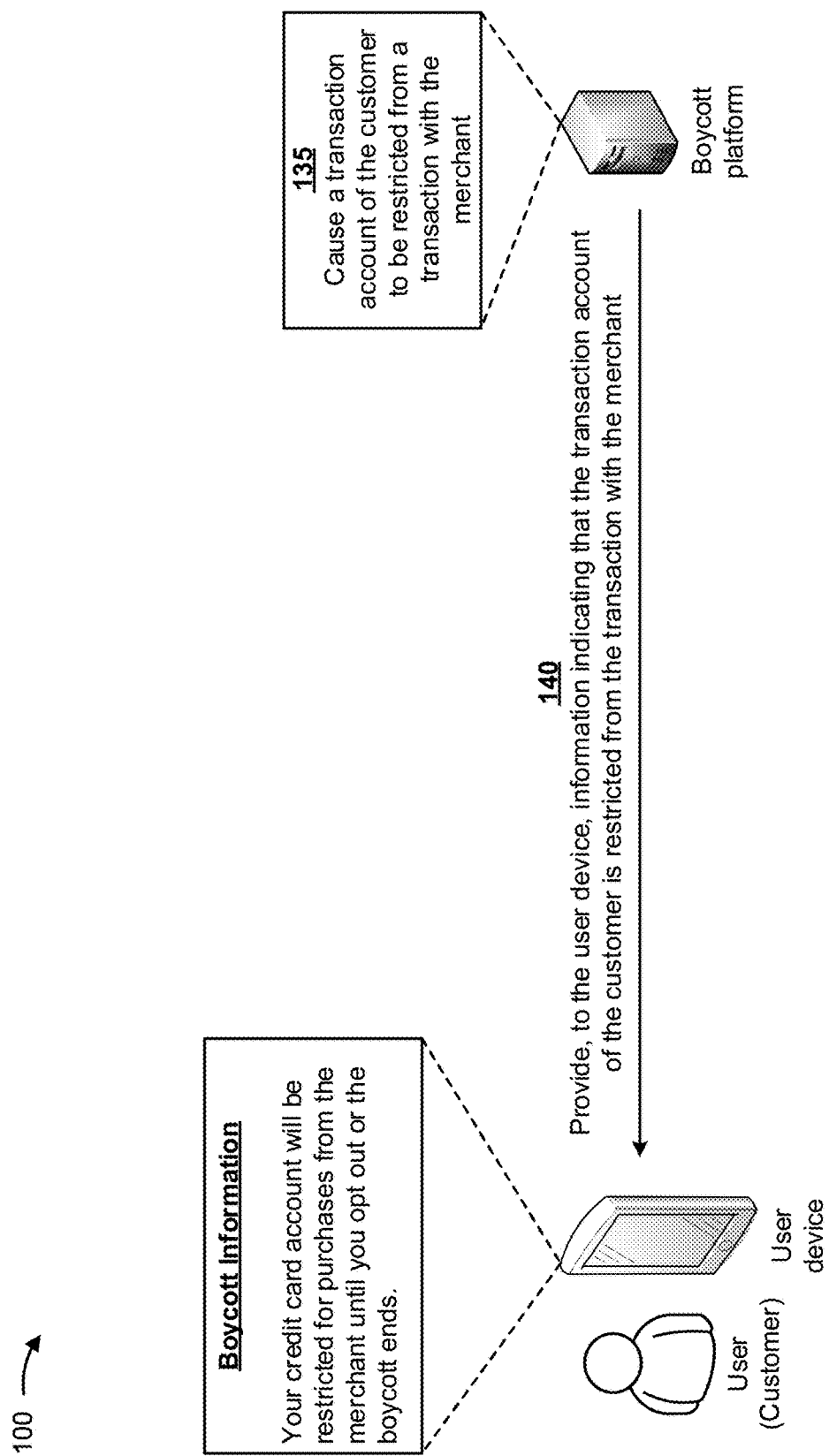

As shown in FIG. 1E, and by reference number 135, the boycott platform may cause a transaction account of the customer to be restricted from a transaction with the merchant based on the customer joining the boycott associated with the merchant. In some implementations, the boycott platform may set controls and/or restrictions on a transaction card of the customer for transactions with the merchant. In some implementations, the boycott platform may identify for which merchants the customer has transaction accounts, and may cause server devices associated with the identified merchants to update a record associated with the customer and relating to the merchant (e.g., to block transactions attempted with the merchant).

For example, if the merchant is subject to the boycott joined by the customer (e.g., on a boycott list maintained by the boycott platform), the boycott platform may cause the transaction card of the customer to be disabled for purchases with the merchant. In some implementations, the boycott platform may prevent the customer's transaction account and/or card from being used for purchases with the merchant (e.g., based on a merchant identifier for the merchant), with a family of merchants, with subsidiaries of the merchant, and/or the like. In some implementations, if the customer is a company, the boycott platform may prevent employees of the company from utilizing a corporate transaction account and/or card to make purchases from the merchant.

In some implementations, the boycott platform may provide, to the user device, a notification indicating that the transaction account associated with the customer is to be restricted from the transaction with the merchant due to the boycott. The boycott platform may prevent the transaction account from being used for a purchase from the merchant, a supplier associated with the merchant, and/or the like. In some implementations, the boycott platform may receive information indicating an attempted transaction with the merchant via the transaction account associated with the customer, may deny the attempted transaction with the merchant, and may provide, to the user device, a notification indicating that the boycott is a reason for denying the attempted transaction. In some implementations, the boycott platform may receive, from the user device, information indicating that the customer desires to opt out of the boycott of the merchant, and may permit the transaction account associated with the user device to be used for the transaction with the merchant based on receiving the information indicating that the customer desires to opt out of the boycott of the merchant.

In some implementations, the boycott platform may receive information identifying a current location of the customer (e.g., via global positioning system (GPS) coordinates of the user device) and may determine that the customer is within a geographic distance of the merchant. The boycott platform may provide, to the user device of the customer, a notification reminding the customer of the boycott. This way, even if the customer is planning on paying with cash, the customer is notified of the boycott.

As further shown in FIG. 1E, and by reference number 140, the boycott platform may provide, to the user device, information indicating that the transaction account of the customer is restricted from the transaction with the merchant. In some implementations, the boycott platform may provide, to the user device, the information indicating that the transaction account of the customer is restricted from the transaction with the merchant when the customer attempts to conduct a transaction with the merchant. The user device may receive the information indicating that the transaction account of the customer restricted and may display the information to the customer via a user interface. For example, as shown in FIG. 1E, the user interface may include information indicating that the customer's credit card account will be restricted for purchases from the merchant until the customer opt outs of the boycott or the boycott ends. In this way, the customer may be made aware of why a transaction was declined if the customer was unaware that the merchant was part of a boycott joined by the customer. In some implementations, the boycott platform may provide, to the user device, a notification indicating that the transaction account cannot be used for all future purchases from the merchant, before the customer attempts to conduct a transaction with the merchant.

Figure 1F:
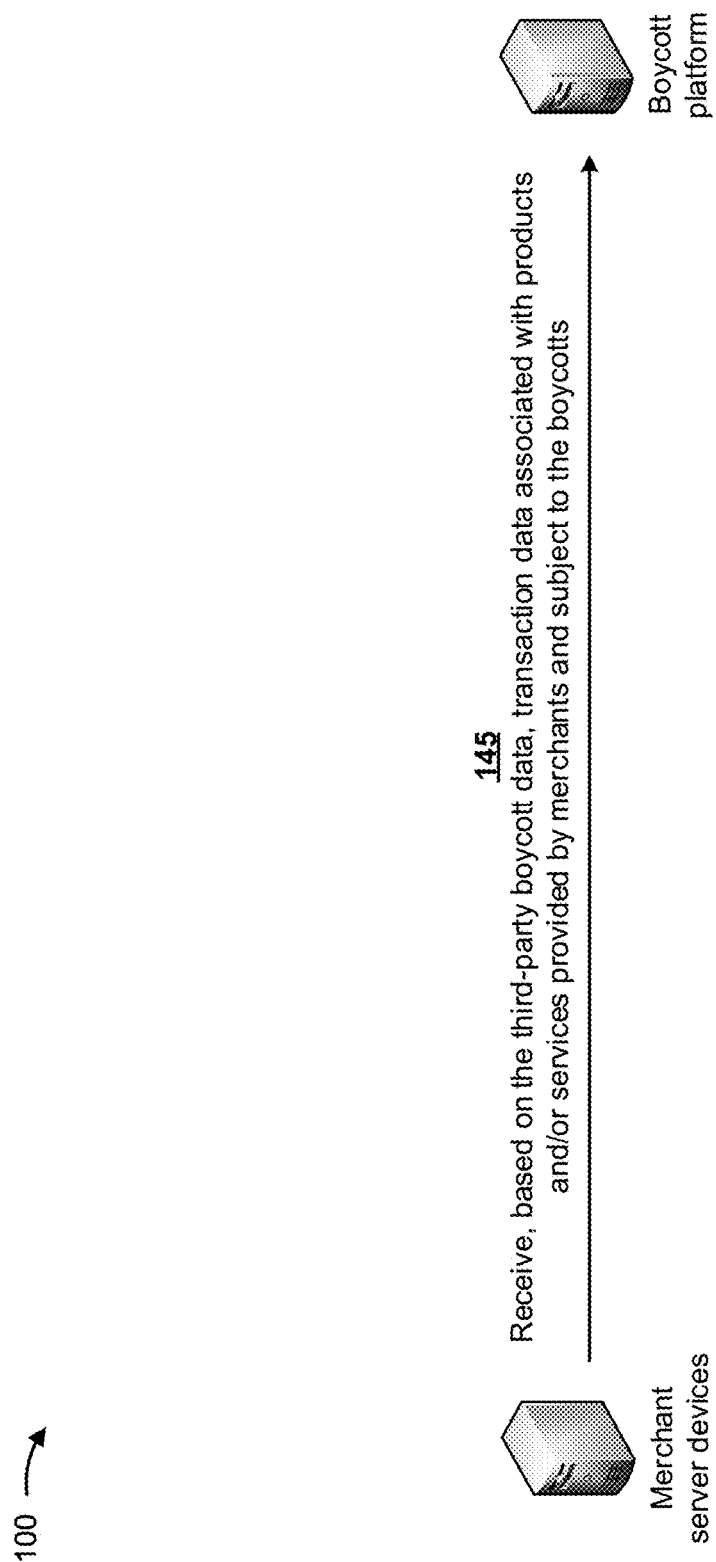

As shown in FIG. 1F, and by reference number 145, the boycott platform may receive, from merchant server devices and based on the third-party boycott data, transaction data associated with products and/or services provided by merchants and subject to the boycotts. In some implementations, the transaction data may include historical transaction data (e.g., indicating historical quantities of products and/or services sold, revenue received from the sales of the products and/or the services, and/or the like) associated with the merchants and prior to the boycotts; current transaction data (e.g., indicating current quantities of the products and/or the services sold, revenue received from the sales of the products and/or the services, and/or the like) associated with the merchants and during the boycotts; transaction data (e.g., indicating current quantities of the products and/or the services sold, revenue received from the sales of the products and/or the services, and/or the like) associated with merchants that are not subject to the boycotts; and/or the like. In this way, the boycott platform may determine the boycotts are affecting the sales of the products and/or the service of the merchants subject to the boycotts.

Figure 1G:
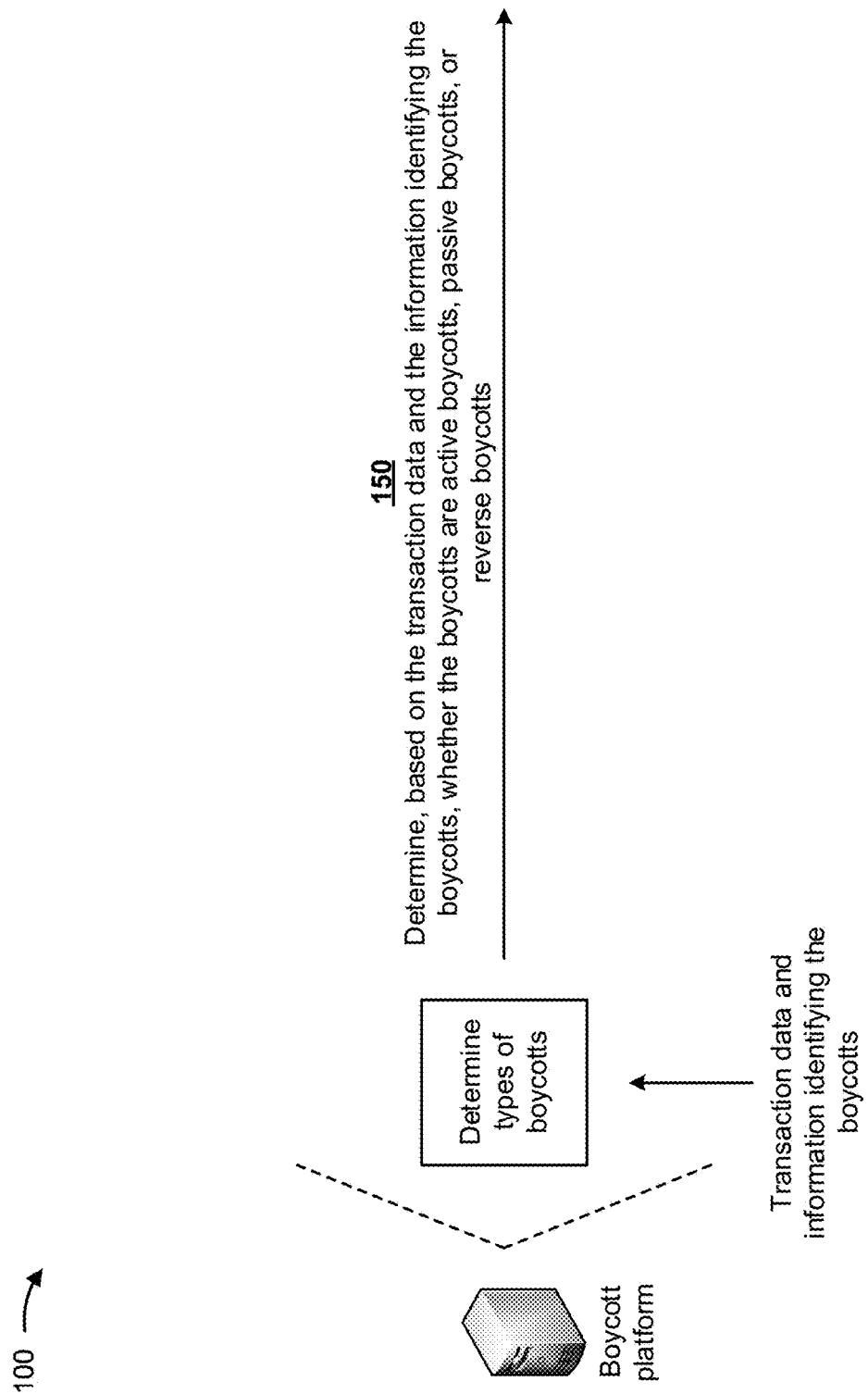

As shown in FIG. 1G, and by reference number 150, the boycott platform may determine, based on the transaction data and information identifying the boycotts, whether the boycotts are active boycotts, passive boycotts, or reverse boycotts. In some implementations, the transaction data may enable the boycott platform to track a quantity of customers that are actively boycotting merchants (e.g., verified customers who stop shopping at merchants), passively boycotting merchants (e.g., non-customers of the merchants that remove the merchants from consideration), and reverse boycotting merchants (e.g., inactive customers that shop at competitors of the merchants under boycott in order to make a statement). The boycott platform may determine a quantity of customers that are actively boycotting a merchant based on analyzing the transaction data associated with customers of the merchant, non-customers of the merchant, and/or the like. The boycott platform may determine a quantity of customers that are passively boycotting a merchant based on analyzing the transaction data of non-customers of the merchant that will not make purchases from the merchant due to the boycott. The boycott platform may determine a quantity of customers that are reverse boycotting a merchant based on analyzing the transaction data associated with competitors of the merchant (e.g., to determine whether the customers are penalizing the merchant and shopping at the competitors).

Figure 1H:
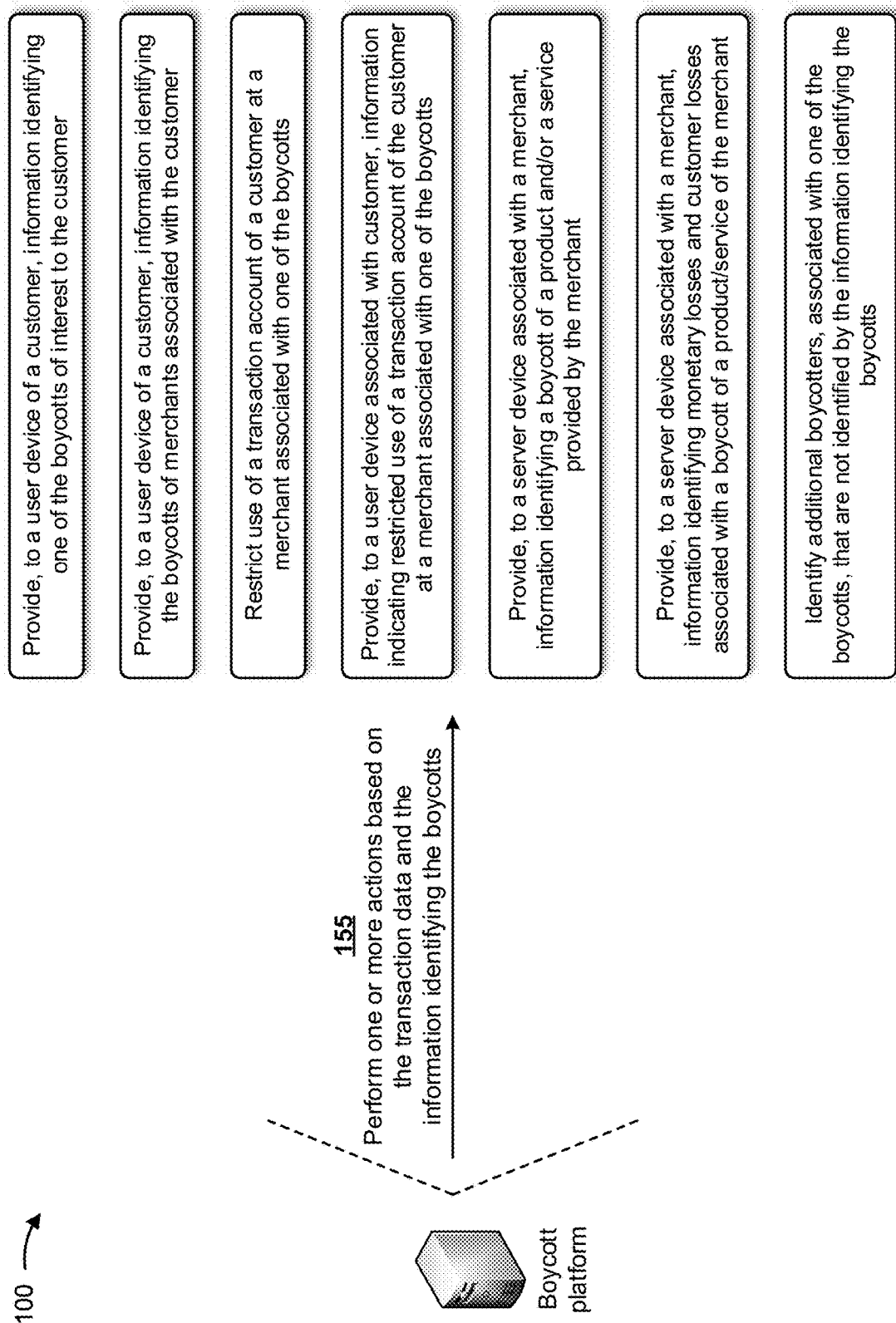

As shown in FIG. 1H, and by reference number 155, the boycott platform may perform one or more actions based on the transaction data and the information identifying the boycotts. In some implementations, the one or more actions may include the boycott platform providing, to a user device of a customer, information identifying one of the boycotts of interest to the customer. In this way, the boycott platform may make the customer aware of boycotts of interest, which may conserve computing resources (e.g., processing resources, memory resources, and/or the like), networking resources, and/or the like that would otherwise be wasted in searching for boycotts of interest.

In some implementations, the one or more actions may include the boycott platform providing, to a user device of a customer, information identifying the boycotts of merchants associated with the customer. In this way, the boycott platform may make the customer aware of the boycotts of the merchants, which may conserve computing resources (e.g., processing resources, memory resources, and/or the like), networking resources, and/or the like that would otherwise be wasted in searching for boycotts of merchants associated with the customer.

In some implementations, the one or more actions may include the boycott platform restricting use of a transaction account of a customer at a merchant associated with one of the boycotts. In this way, the boycott platform may automatically prevent transactions with the merchant without requiring the customer to consume computing resources (e.g., processing resources, memory resources, and/or the like), networking resources, and/or the like in attempting to determine if the merchant is subject to a boycott.

In some implementations, the one or more actions may include the boycott platform providing, to a user device associated with a customer, information indicating restricted use of a transaction account of the customer at a merchant associated with one of the boycotts. In this way, the boycott platform may automatically inform the customer of restricted transactions with the merchant without requiring the customer to consume computing resources (e.g., processing resources, memory resources, and/or the like), networking resources, and/or the like in attempting to determine why a transaction is being denied.

In some implementations, the one or more actions may include the boycott platform providing, to a server device associated with the merchant, the information identifying a boycott of a product and/or a service provided by the merchant. In this way, the merchant may cease providing the product and/or the service and may conserve resources that would otherwise be wasted in offering the boycotted product and/or the service.

In some implementations, the one or more actions may include the boycott platform providing, to the server device associated with the merchant, information identifying monetary losses and customer losses associated with the boycott of a product and/or a service of the merchant. Thus, the merchant may easily realize an impact (e.g., the monetary losses and the customer losses) associated with the boycotted product and/or service. In this way, the merchant may cease providing the product and/or the service and may conserve resources that would otherwise be wasted in offering the boycotted product and/or the service.

In some implementations, the one or more actions may include the boycott platform identifying additional boycotters, associated with one of the boycotts, that are not identified by the information identifying the boycotts. For example, the boycott platform may identify suppliers of the merchant that are associated with the one of the boycotts, non-customers of the merchant that are not making purchases with the merchant based on the one of the boycotts, and/or the like.

In some implementations, the one or more actions may include the boycott platform retraining the machine learning model based on the transaction data, information identifying the merchant, information identifying the customer, the information indicating that the customer desires to join the boycott, the information identifying the boycott of the merchant, and/or the like. In this way, the machine learning model may more accurately determine boycotts of merchants that are predicted to be of interest to customers.

In some implementations, the one or more actions may include the boycott platform generating an action plan for the merchant to help end the boycott of the merchant. For example, the boycott platform may determine the cause of the boycott, may review historical solutions to such a cause, and may generate the action plan based on the historical solutions. For example, the action plan may include generating an advertisement campaign, identifying charitable sources to which to contribute funds, ceasing performance the boycotted activity, reducing performance of the boycotted activity, and/or the like.

Figure 1I:
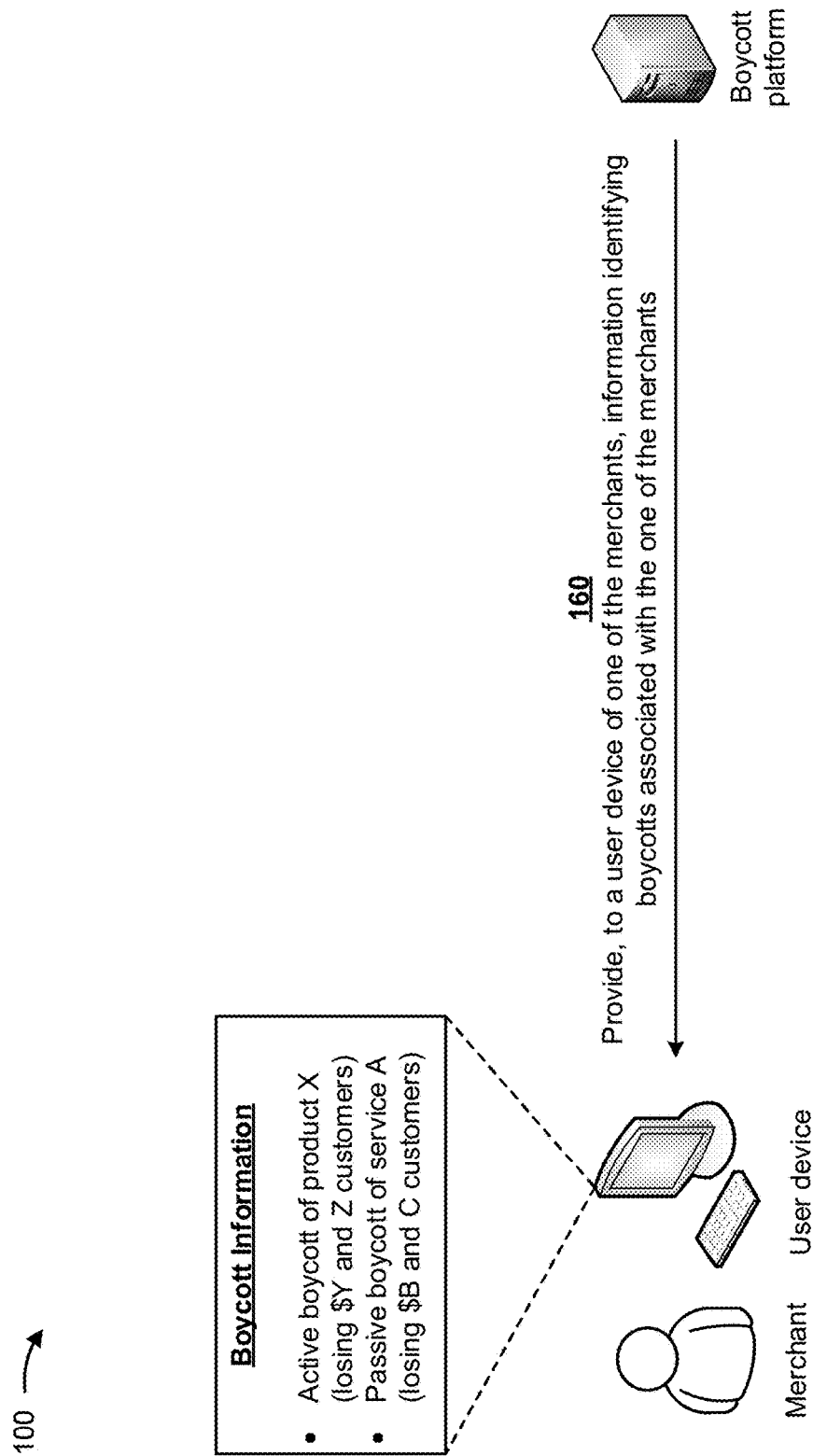

As shown in FIG. 1I, and by reference number 160, the boycott platform may provide, to a user device of one of the merchants, information identifying boycotts associated with the one of the merchants. The user device may receive the information identifying the boycotts and may provide the information identifying the boycotts for display to the one of the merchants via a user interface. For example, the user interface may include information indicating monetary losses and customer losses associated with the boycotts, information identifying an active boycott (e.g., an active boycott of product X, losing $Y and Z customers) of a product of the one of the merchants, information identifying a passive boycott (e.g., a passive boycott of service A, losing $B and C customers) of a service of the one of the merchants, information identifying a reverse boycott of the one of the merchants, and/or the like.

In some implementations, the boycott platform may enable customers to utilize financial power to support a social movement and may provide an aggregate view of the customers. The boycott platform may raise awareness of customers about boycotts and/or social movements and may alert merchants about the affects of such boycotts (e.g., which may cause the merchants to change for the better).

In this way, several different stages of the process for determining an aggregate effect of a boycott on a merchant may be automated with machine learning and transaction data, which may improve speed and efficiency of the process and conserve computing resources (e.g., processing resources, memory resources, and/or the like). Furthermore, implementations described herein use a rigorous, computerized process to perform tasks or roles that were not previously performed. For example, currently there does not exist a technique that utilizes machine learning and transaction data to determine an aggregate effect of a boycott on a merchant. Further, the process for determining an aggregate effect of a boycott on a merchant conserves resources (e.g., processing resources, memory resources, network resources, manufacturing resources, transportation resources, and/or the like) that would otherwise be wasted in participating in a boycott and/or continuing to produce and/or promote a boycotted product or service.

As indicated above, FIGS. 1A-1I are provided merely as examples. Other examples may differ from what is described with regard to FIGS. 1A-1I.

Figure 2:
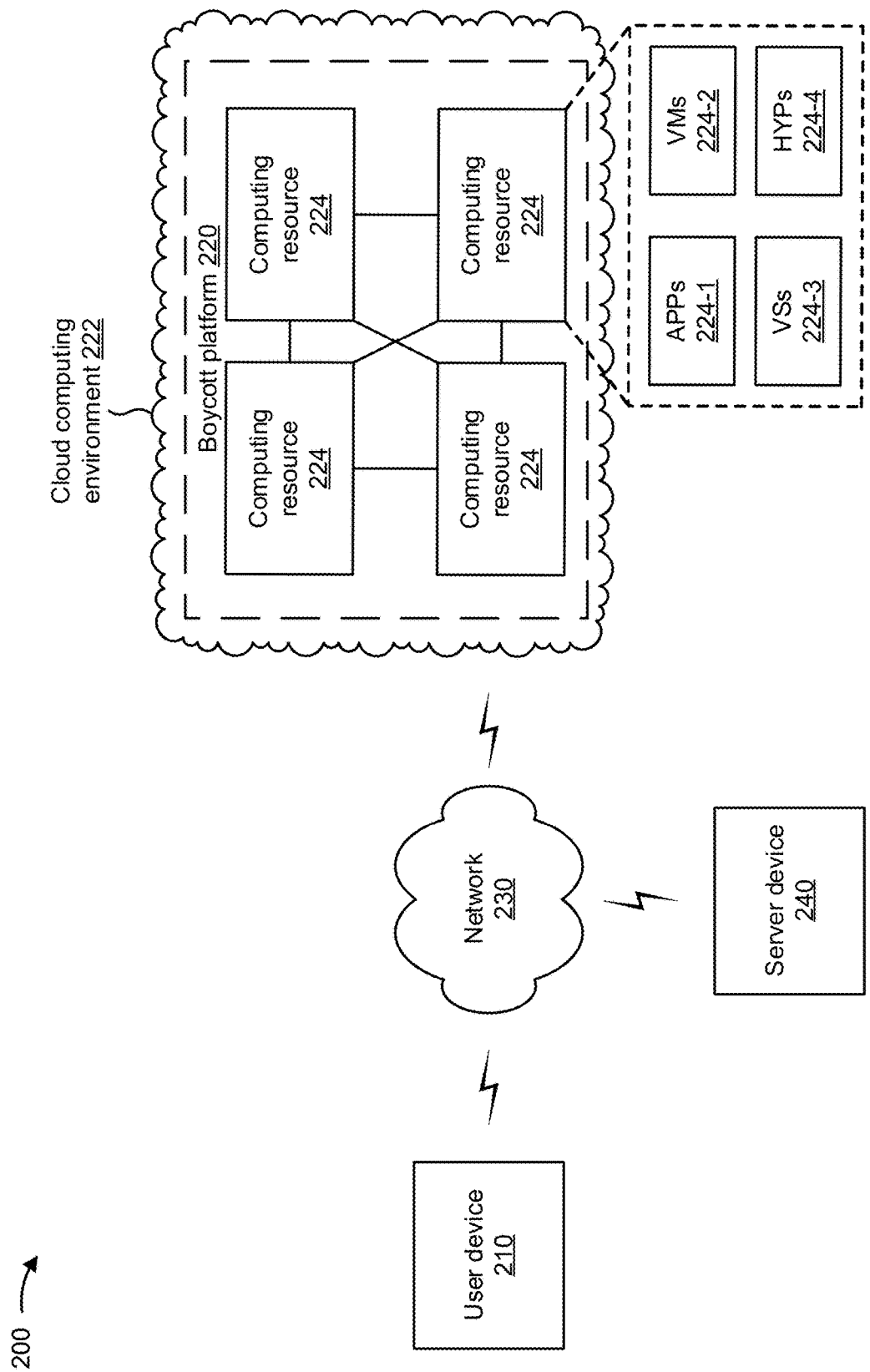
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user device 210, a boycott platform 220, a network 230, and a server device 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to boycott platform 220 and/or server device 240.

Boycott platform 220 includes one or more devices that may utilize machine learning and transaction data to determine an aggregate effect of a boycott on a merchant. In some implementations, boycott platform 220 may be modular such that certain software components may be swapped in or out depending on a particular need. As such, boycott platform 220 may be easily and/or quickly reconfigured for different uses. In some implementations, boycott platform 220 may receive information from and/or transmit information to one or more user devices 210 and/or server devices 240.

In some implementations, as shown, boycott platform 220 may be hosted in a cloud computing environment 222. Notably, while implementations described herein describe boycott platform 220 as being hosted in cloud computing environment 222, in some implementations, boycott platform 220 may be non-cloud-based (i.e., may be implemented outside of a cloud computing environment) or may be partially cloud-based.

Cloud computing environment 222 includes an environment that may host boycott platform 220. Cloud computing environment 222 may provide computation, software, data access, storage, etc. services that do not require end-user knowledge of a physical location and configuration of system(s) and/or device(s) that host boycott platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host boycott platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with boycott platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 or an operator of boycott platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with a merchant, a financial institution, a social media service, a social movement organization, and/or the like. In some implementations, server device 240 may receive information from and/or transmit information to user device 210 and/or boycott platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
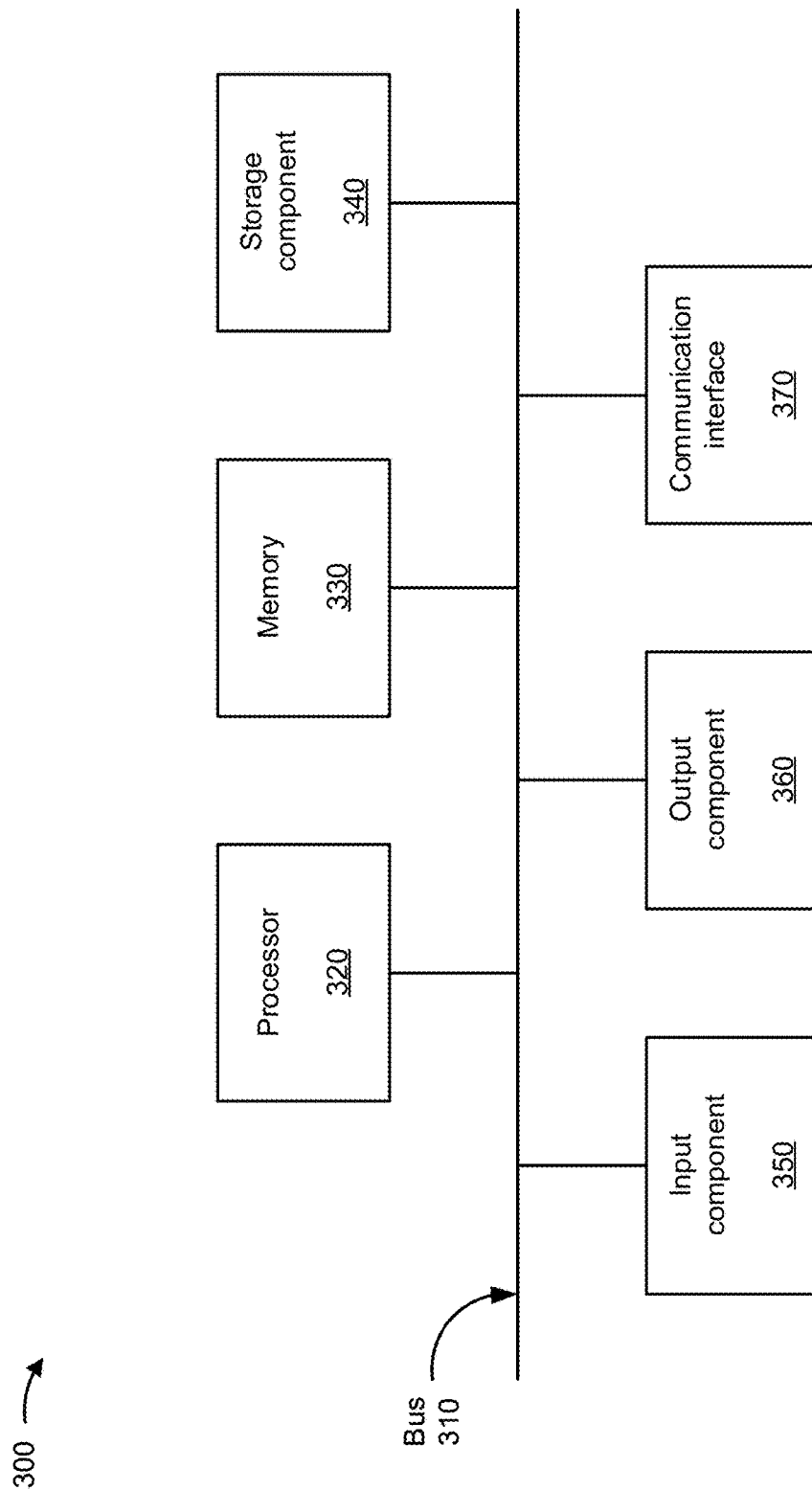
FIG. 3 is a diagram of example components of one or more devices of FIG. 2.

FIG. 3 is a diagram of example components of a device 300. Device 300 may correspond to user device 210, boycott platform 220, computing resource 224, and/or server device 240. In some implementations, user device 210, boycott platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
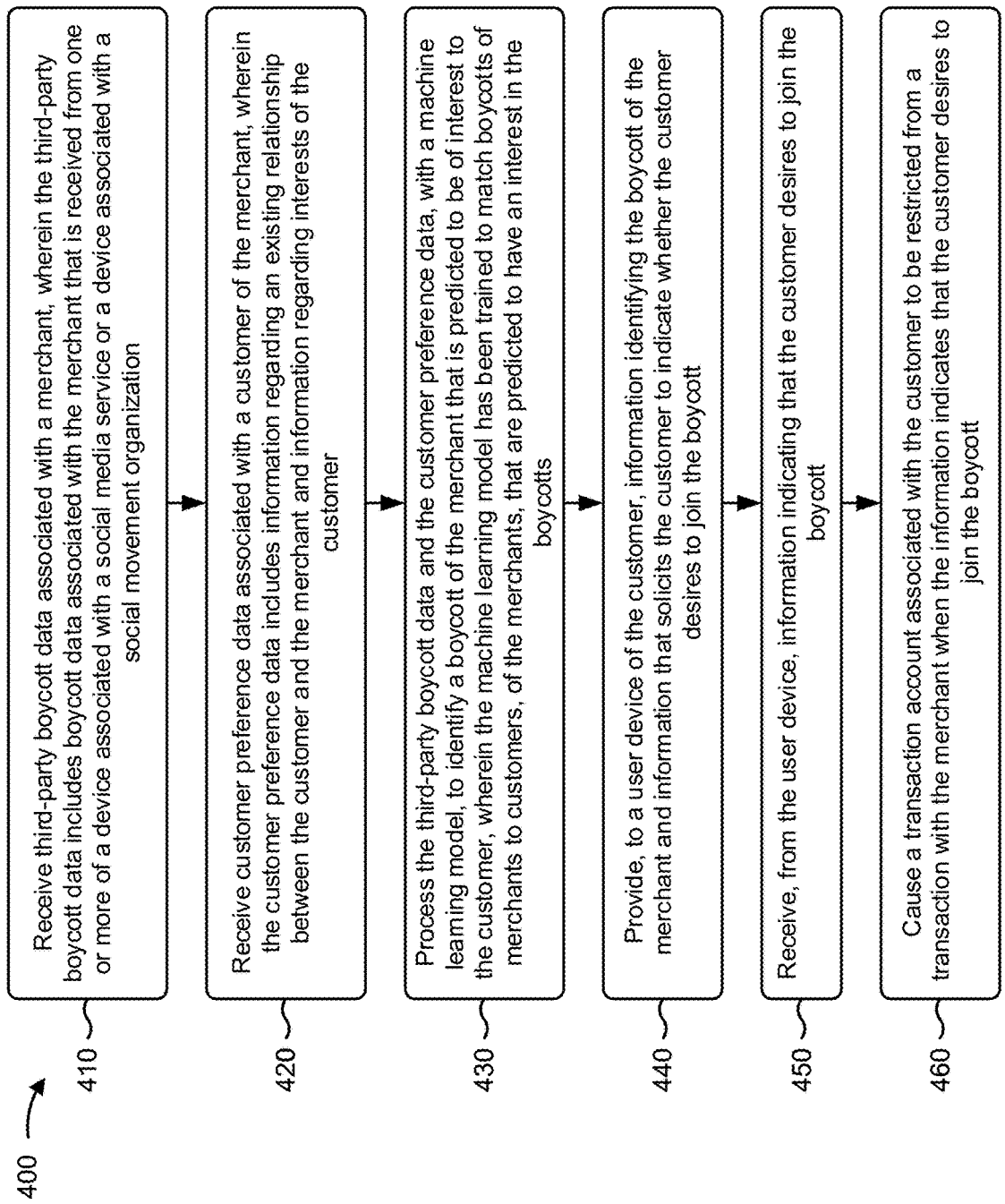

FIG. 4 is a flow chart of an example process 400 for utilizing machine learning and transaction data to determine an aggregate effect of a boycott on a merchant. In some implementations, one or more process blocks of FIG. 4 may be performed by a boycott platform (e.g., boycott platform 220). In some implementations, one or more process blocks of FIG. 4 may be performed by another device or a group of devices separate from or including the boycott platform, such as a user device (e.g., user device 210) and/or a server device (e.g., server device 240).

As shown in FIG. 4, process 400 may include receiving third-party boycott data associated with a merchant, wherein the third-party boycott data includes boycott data associated with the merchant that is received from one or more of a device associated with a social media service or a device associated with a social movement organization (block 410). For example, the boycott platform (e.g., using computing resource 224, processor 320, communication interface 370, and/or the like) may receive third-party boycott data associated with a merchant, as described above in connection with FIGS. 1A-3. In some aspects, the third-party boycott data may include boycott data associated with the merchant that is received from one or more of a device associated with a social media service or a device associated with a social movement organization.

As further shown in FIG. 4, process 400 may include receiving customer preference data associated with a customer of the merchant, wherein the customer preference data includes information regarding an existing relationship between the customer and the merchant and information regarding interests of the customer (block 420). For example, the boycott platform (e.g., using computing resource 224, processor 320, communication interface 370, and/or the like) may receive customer preference data associated with a customer of the merchant, as described above in connection with FIGS. 1A-3. In some aspects, the customer preference data may include information regarding an existing relationship between the customer and the merchant and information regarding interests of the customer.

As further shown in FIG. 4, process 400 may include processing the third-party boycott data and the customer preference data, with a machine learning model, to identify a boycott of the merchant that is predicted to be of interest to the customer, wherein the machine learning model has been trained to match boycotts of merchants to customers, of the merchants, that are predicted to have an interest in the boycotts (block 430). For example, the boycott platform (e.g., using computing resource 224, processor 320, memory 330, and/or the like) may process the third-party boycott data and the customer preference data, with a machine learning model, to identify a boycott of the merchant that is predicted to be of interest to the customer, as described above in connection with FIGS. 1A-3. In some aspects, the machine learning model may have been trained to match boycotts of merchants to customers, of the merchants, that are predicted to have an interest in the boycotts.

As further shown in FIG. 4, process 400 may include providing, to a user device of the customer, information identifying the boycott of the merchant and information that solicits the customer to indicate whether the customer desires to join the boycott (block 440). For example, the boycott platform (e.g., using computing resource 224, processor 320, memory 330, communication interface 370, and/or the like) may provide, to a user device of the customer, information identifying the boycott of the merchant and information that solicits the customer to indicate whether the customer desires to join the boycott, as described above in connection with FIGS. 1A-3.

As further shown in FIG. 4, process 400 may include receiving, from the user device, information indicating that the customer desires to join the boycott (block 450). For example, the boycott platform (e.g., using computing resource 224, processor 320, communication interface 370, and/or the like) may receive, from the user device, information indicating that the customer desires to join the boycott, as described above in connection with FIGS. 1A-3.

As further shown in FIG. 4, process 400 may include causing a transaction account associated with the customer to be restricted from a transaction with the merchant when the information indicates that the customer desires to join the boycott (block 460). For example, the boycott platform (e.g., using computing resource 224, processor 320, memory 330, storage component 340, communication interface 370, and/or the like) may cause a transaction account associated with the customer to be restricted from a transaction with the merchant when the information indicates that the customer desires to join the boycott, as described above in connection with FIGS. 1A-3.

Process 400 may include additional implementations, such as any single implementation or any combination of implementations described below and/or in connection with one or more other processes described elsewhere herein.

In some implementations, the boycott platform may receive transaction data associated with the merchant and the boycott, and may perform one or more actions based on the transaction data and the information identifying the boycott of the merchant.

In some implementations, when performing the one or more actions, the boycott platform may provide, to a server device associated with the merchant, the information identifying the boycott of the merchant, provide, to the server device associated with the merchant, information identifying monetary losses and customer losses associated with the boycott of the merchant, provide, to the user device, a notification indicating that the transaction account associated with the customer is to be restricted from the transaction with the merchant due to the boycott, and/or the like.

In some implementations, the boycott platform may receive transaction data associated with the boycott and associated with the merchant and another merchant in competition with the merchant; may determine, based on the transaction data and the information identifying the boycott of the merchant, whether the boycott is an active boycott, a passive boycott, or a reverse boycott, where the active boycott may be associated with one or more customers of the merchant, the passive boycott may be associated with one or more non-customers of the merchant, and the reverse boycott may be associated with one or more customers of the other merchant in competition with the merchant; and may provide, to a server device associated with the merchant, information indicating whether the boycott is the active boycott, the passive boycott, or the reverse boycott.

In some implementations, when causing the transaction account associated with the customer to be restricted, the boycott platform may provide, to the user device and before the user device confirms the transaction with the merchant, a notification indicating that the transaction account associated with the customer is to be restricted from the transaction with the merchant due to the boycott; may prevent the transaction account from being used for a purchase from the merchant; may prevent the transaction account from being used for a purchase from a supplier associated with the merchant; and/or the like.

In some implementations, the boycott platform may receive information indicating an attempted transaction with the merchant via the transaction account associated with the customer, may deny the attempted transaction with the merchant, and may provide, to the user device, a notification indicating that the boycott is a reason for denying the attempted transaction. In some implementations, the boycott platform may receive, from the user device, information indicating that the customer desires to opt out of the boycott of the merchant, and may permit the transaction account associated with the user device to be used for the transaction with the merchant based on receiving the information indicating that the customer desires to opt out of the boycott of the merchant.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
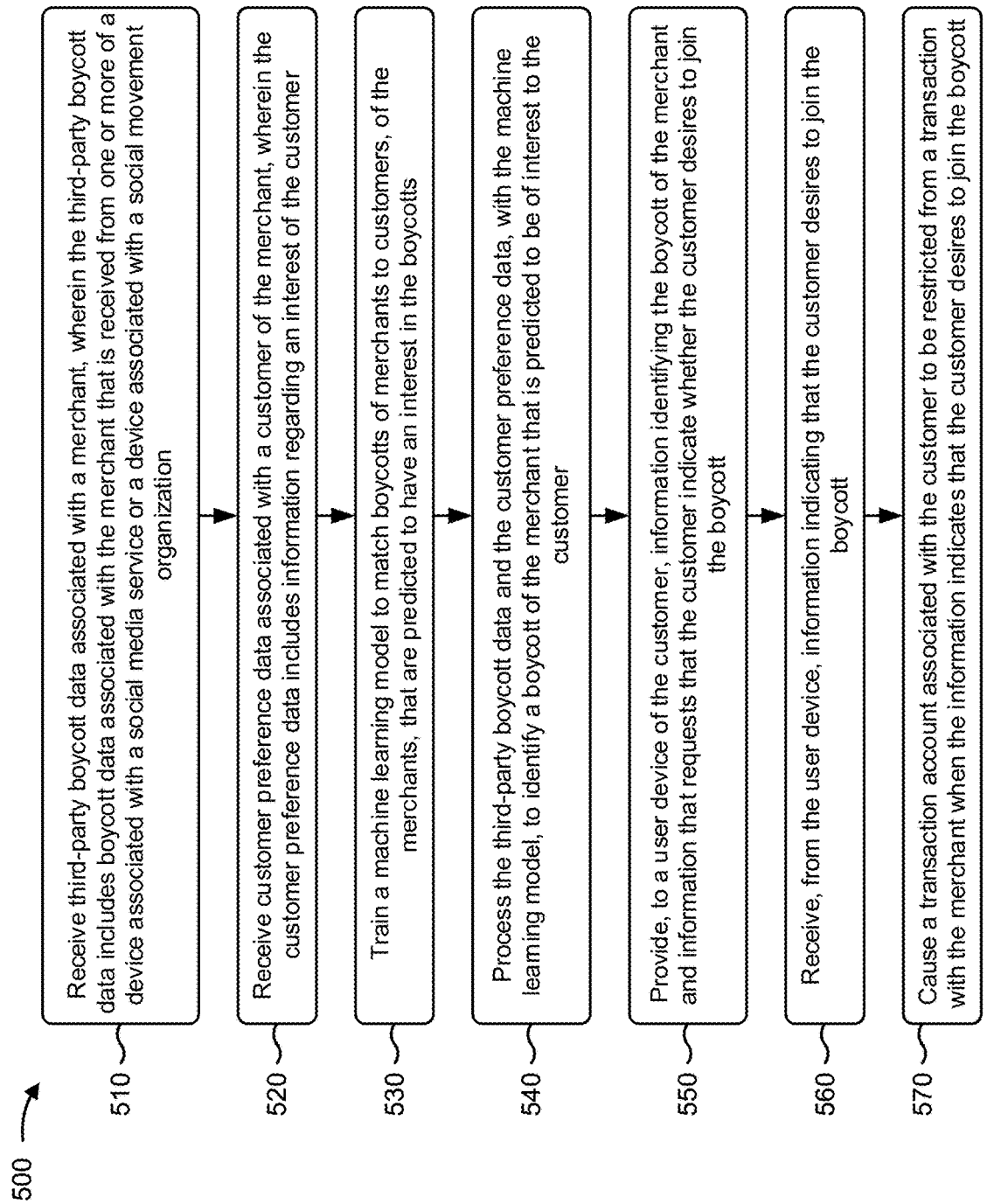

FIG. 5 is a flow chart of an example process 500 for utilizing machine learning and transaction data to determine an aggregate effect of a boycott on a merchant. In some implementations, one or more process blocks of FIG. 5 may be performed by a boycott platform (e.g., boycott platform 220). In some implementations, one or more process blocks of FIG. 5 may be performed by another device or a group of devices separate from or including the boycott platform, such as a user device (e.g., user device 210) and/or a server device (e.g., server device 240).

As shown in FIG. 5, process 500 may include receiving third-party boycott data associated with a merchant, wherein the third-party boycott data includes boycott data associated with the merchant that is received from one or more of a device associated with a social media service or a device associated with a social movement organization (block 510). For example, the boycott platform (e.g., using computing resource 224, processor 320, communication interface 370, and/or the like) may receive third-party boycott data associated with a merchant, as described above in connection with FIGS. 1A-3. In some aspects, the third-party boycott data may include boycott data associated with the merchant that is received from one or more of a device associated with a social media service or a device associated with a social movement organization.

As further shown in FIG. 5, process 500 may include receiving customer preference data associated with a customer of the merchant, wherein the customer preference data includes information regarding an interest of the customer (block 520). For example, the boycott platform (e.g., using computing resource 224, processor 320, communication interface 370, and/or the like) may receive customer preference data associated with a customer of the merchant, as described above in connection with FIGS. 1A-3. In some aspects, the customer preference data may include information regarding an interest of the customer.

As further shown in FIG. 5, process 500 may include training a machine learning model to match boycotts of merchants to customers, of the merchants, that are predicted to have an interest in the boycotts (block 530). For example, the boycott platform (e.g., using computing resource 224, processor 320, memory 330, and/or the like) may train a machine learning model to match boycotts of merchants to customers, of the merchants, that are predicted to have an interest in the boycotts, as described above in connection with FIGS. 1A-3.

As further shown in FIG. 5, process 500 may include processing the third-party boycott data and the customer preference data, with the machine learning model, to identify a boycott of the merchant that is predicted to be of interest to the customer (block 540). For example, the boycott platform (e.g., using computing resource 224, processor 320, storage component 340, and/or the like) may process the third-party boycott data and the customer preference data, with the machine learning model, to identify a boycott of the merchant that is predicted to be of interest to the customer, as described above in connection with FIGS. 1A-3.

As further shown in FIG. 5, process 500 may include providing, to a user device of the customer, information identifying the boycott of the merchant and information that requests that the customer indicate whether the customer desires to join the boycott (block 550). For example, the boycott platform (e.g., using computing resource 224, processor 320, communication interface 370, and/or the like) may provide, to a user device of the customer, information identifying the boycott of the merchant and information that requests that the customer indicate whether the customer desires to join the boycott, as described above in connection with FIGS. 1A-3.

As further shown in FIG. 5, process 500 may include receiving, from the user device, information indicating that the customer desires to join the boycott (block 560). For example, the boycott platform (e.g., using computing resource 224, processor 320, communication interface 370, and/or the like) may receive, from the user device, information indicating that the customer desires to join the boycott, as described above in connection with FIGS. 1A-3.

As further shown in FIG. 5, process 500 may include causing a transaction account associated with the customer to be restricted from a transaction with the merchant when the information indicates that the customer desires to join the boycott (block 570). For example, the boycott platform (e.g., using computing resource 224, processor 320, memory 330, storage component 340, communication interface 370, and/or the like) may cause a transaction account associated with the customer to be restricted from a transaction with the merchant when the information indicates that the customer desires to join the boycott, as described above in connection with FIGS. 1A-3.

Process 500 may include additional implementations, such as any single implementation or any combination of implementations described below and/or in connection with one or more other processes described elsewhere herein.

In some implementations, the boycott platform may receive transaction data associated with the merchant and the boycott, and may perform one or more actions based on the transaction data and the information identifying the boycott of the merchant. In some implementations, when performing the one or more actions, the boycott platform may retrain the machine learning model based on the transaction data and the information identifying the boycott of the merchant, may provide, to a server device associated with the merchant, the information identifying the boycott of the merchant, may provide, to the server device associated with the merchant, information identifying monetary losses and customer losses associated with the boycott of the merchant, may provide, to the user device, a notification indicating that the transaction account associated with the customer is to be restricted from the transaction with the merchant due to the boycott, and/or the like.

In some implementations, the boycott of the merchant may include a boycott of one or more products provided by the merchant, one or more services provided by the merchant, and/or the like. In some implementations, when causing the transaction account associated with the customer to be restricted, the boycott platform may prevent the transaction account from being used for a purchase from the merchant, may prevent the transaction account from being used for a purchase from a subsidiary of the merchant, may prevent the transaction account from being used for a purchase from a supplier associated with the merchant, and/or the like.

In some implementations, the boycott platform may receive information indicating an attempted transaction with the merchant via the transaction account associated with the customer, and may deny the attempted transaction with the merchant based on the boycott of the merchant. In some implementations, the boycott platform may receive, from the user device, information indicating that the customer desires to opt out of the boycott of the merchant, and may permit the transaction account associated with the user device to be used for the transaction with the merchant based on receiving the information indicating that the customer desires to opt out of the boycott of the merchant.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing machine learning and transaction data to determine an aggregate effect of a boycott on a merchant. In some implementations, one or more process blocks of FIG. 6 may be performed by a boycott platform (e.g., boycott platform 220). In some implementations, one or more process blocks of FIG. 6 may be performed by another device or a group of devices separate from or including the boycott platform, such as a user device (e.g., user device 210) and/or a server device (e.g., server device 240).

As shown in FIG. 6, process 600 may include receiving third-party boycott data associated with a merchant, wherein the third-party boycott data includes boycott data associated with the merchant that is received from one or more of a device associated with a social media service or a device associated with a social movement organization (block 610). For example, the boycott platform (e.g., using computing resource 224, processor 320, communication interface 370, and/or the like) may receive third-party boycott data associated with a merchant, as described above in connection with FIGS. 1A-3. In some aspects, the third-party boycott data may include boycott data associated with the merchant that is received from one or more of a device associated with a social media service or a device associated with a social movement organization.

As further shown in FIG. 6, process 600 may include receiving customer preference data associated with a customer of the merchant, wherein the customer preference data includes information regarding an interest of the customer (block 620). For example, the boycott platform (e.g., using computing resource 224, processor 320, communication interface 370, and/or the like) may receive customer preference data associated with a customer of the merchant, as described above in connection with FIGS. 1A-3. In some aspects, the customer preference data may include information regarding an interest of the customer.

As further shown in FIG. 6, process 600 may include processing the third-party boycott data and the customer preference data, with a machine learning model, to identify a boycott of the merchant that is predicted to be of interest to the customer, wherein the machine learning model has been trained to match boycotts of merchants to customers, of the merchants, that are predicted to have an interest in the boycotts (block 630). For example, the boycott platform (e.g., using computing resource 224, processor 320, memory 330, and/or the like) may process the third-party boycott data and the customer preference data, with a machine learning model, to identify a boycott of the merchant that is predicted to be of interest to the customer, as described above in connection with FIGS. 1A-3. In some aspects, the machine learning model may have been trained to match boycotts of merchants to customers, of the merchants, that are predicted to have an interest in the boycotts.

As further shown in FIG. 6, process 600 may include providing, to a user device of the customer, information identifying the boycott of the merchant and information that requests that the customer indicate whether the customer desires to join the boycott (block 640). For example, the boycott platform (e.g., using computing resource 224, processor 320, communication interface 370, and/or the like) may provide, to a user device of the customer, information identifying the boycott of the merchant and information that requests that the customer indicate whether the customer desires to join the boycott, as described above in connection with FIGS. 1A-3.

As further shown in FIG. 6, process 600 may include receiving, from the user device, information indicating that the customer desires to join the boycott (block 650). For example, the boycott platform (e.g., using computing resource 224, processor 320, communication interface 370, and/or the like) may receive, from the user device, information indicating that the customer desires to join the boycott, as described above in connection with FIGS. 1A-3.

As further shown in FIG. 6, process 600 may include causing a transaction account associated with the customer to be restricted from a transaction with the merchant when the information indicates that the customer desires to join the boycott (block 660). For example, the boycott platform (e.g., using computing resource 224, processor 320, memory 330, storage component 340, communication interface 370, and/or the like) may cause a transaction account associated with the customer to be restricted from a transaction with the merchant when the information indicates that the customer desires to join the boycott, as described above in connection with FIGS. 1A-3.

As further shown in FIG. 6, process 600 may include providing, to the user device, information indicating that the transaction account associated with the customer is to be restricted from the transaction with the merchant when the information indicates that the customer desires to join the boycott (block 670). For example, the boycott platform (e.g., using computing resource 224, processor 320, storage component 340, communication interface 370, and/or the like) may provide, to the user device, information indicating that the transaction account associated with the customer is to be restricted from the transaction with the merchant when the information indicates that the customer desires to join the boycott, as described above in connection with FIGS. 1A-3.

Process 600 may include additional implementations, such as any single implementation or any combination of implementations described below and/or in connection with one or more other processes described elsewhere herein.

In some implementations, the boycott platform may receive transaction data associated with the merchant and the boycott, and may perform one or more actions based on the transaction data and the information identifying the boycott of the merchant. In some implementations, the boycott platform may cause the machine learning model to be retrained based on one or more of the transaction data, information identifying the merchant, information identifying the customer, the information indicating that the customer desires to join the boycott, the information identifying the boycott of the merchant, and/or the like.

In some implementations, the boycott platform may prevent the transaction account from being used for a purchase from the merchant, may prevent the transaction account from being used for a purchase from a subsidiary of the merchant, may prevent the transaction account from being used for a purchase from a supplier associated with the merchant, and/or the like.

In some implementations, the boycott platform may receive information indicating an attempted transaction with the merchant via the transaction account associated with the customer, may deny the attempted transaction with the merchant, and may provide, to the user device, a notification indicating that the boycott is a reason for denying the attempted transaction.

In some implementations, the boycott platform may receive, from the user device, information indicating that the customer desires to opt out of the boycott of the merchant, and may permit the transaction account associated with the user device to be used for the transaction with the merchant based on receiving the information indicating that the customer desires to opt out of the boycott of the merchant.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, customer preference data associated with a customer of a merchant and third-party boycott data associated with the merchant;
   processing, by the device, the third-party boycott data and the customer preference data, with a machine learning model trained using a particular feature set, to identify a boycott of the merchant that is predicted to be of interest to the customer,
      wherein the particular feature set is generated based at least in part by performing dimensionality reduction of historical third-party boycott data and historical customer preferences data, and
      wherein the machine learning model applies a classification technique to the particular feature set to determine an output to match boycotts of merchants to customers, of the merchants, that are predicted to have an interest in the boycotts;
   determining, by the device, that the customer desires to join the boycott;
   receiving, by the device, transaction data associated with the boycott and associated with the merchant;
   determining, by the device and based on the transaction data and determining that the customer desires to join the boycott, whether the boycott is an active boycott or a passive boycott,
      wherein the active boycott is associated with one or more customers of the merchant, and
      wherein the passive boycott is associated with one or more non-customers of the merchant; and
   performing, by the device, one or more actions based on the transaction data and information indicating whether the boycott is the active boycott or the passive boycott.

2. The method of claim 1, further comprising:
   receiving, from a user device, information indicating that the customer desires to join the boycott associated with the merchant; and
   where determining that the customer desires to join the boycott comprises:
      determining that the customer desires to join the boycott based on receiving the information.

3. The method of claim 1, further comprising:
   monitoring information about products associated with the merchant;
   determining that information about a particular product, of the products, is negative; and
   determining that there is a boycott of the particular product when a quantity of the negative information about the particular product exceeds a threshold amount.

4. The method of claim 1, further comprising:
   causing a transaction account of the customer to be restricted from a transaction with the merchant based on the customer joining the boycott, or setting restrictions on a transaction card of the customer for transactions with the merchant.

5. The method of claim 1, further comprising:
providing, to a user device, a notification indicating that a transaction account associated with the customer cannot be used for future purchases until the customer opts out of the boycott or the boycott ends.

6. The method of claim 1, further comprising:
receiving, from server devices associated with the merchant and based on the third-party boycott data, prior transaction data and transaction data,
   the prior transaction data associated with the merchant prior to the boycott,
   the prior transaction data indicating one or more of:
      historical quantities of products and services sold, or
      historical revenue received from sales of the products and the services,
   the transaction data associated with the merchant during the boycott, and
   the transaction data indicating one or more of:
      quantities of the products and services sold during the boycott, or
      revenue received from the sales of the products and services during the boycott; and
determining an affect of sales of the products or the services of the merchant subject to the boycott based on the prior transaction data and the transaction data.

7. The method of claim 1, further comprising:
tracking a quantity of customers that are boycotting the merchant based on the transaction data; and
determining an effect of sales on the merchant based on the tracking the quantity of customers.

8. A device, comprising:
one or more memories; and
one or more processors, communicatively coupled to the one or more memories, to:
   receive customer preference data associated with a customer of a merchant and third-party boycott data associated with the merchant;
   process the third-party boycott data and the customer preference data, with a machine learning model trained using a particular feature set, to identify a boycott of the merchant that is predicted to be of interest to the customer,
      wherein the particular feature set is generated based at least in part by performing dimensionality reduction of historical third-party boycott data and historical customer preferences data, and
      wherein the machine learning model applies a classification technique to the particular feature set to determine an output to match boycotts of merchants to customers, of the merchants, that are predicted to have an interest in the boycotts;
   receive transaction data associated with the boycott and associated with the merchant; determine, based on the transaction data, whether the boycott is an active boycott or a passive boycott,
      wherein the active boycott is associated with one or more customers of the merchant, and
      wherein the passive boycott is associated with one or more non-customers of the merchant; and
   perform one or more actions based on the transaction data and information indicating whether the boycott is the active boycott or the passive boycott.

9. The device of claim 8, wherein the one or more processors are further to:
   provide, to a user device, information identifying the boycott of the merchant; and
   receive, from the user device, information indicating that the customer desires to join the boycott.

10. The device of claim 8, wherein the one or more processors, when performing one or more actions, are to:
   determine a cause of the boycott;
   review one or more historical solutions based on the cause of the boycott; and
   generate an action plan based on the one or more historical solutions.

11. The device of claim 8, wherein the one or more processors are further to:
   cause a transaction account of the customer to be restricted from a transaction with one or more subsidiaries of the merchant.

12. The device of claim 8, wherein the one or more processors are further to:
   monitor information about products associated with the merchant;
   determine that information about a particular product, of the products, is negative; and
   determine that there is a boycott of the particular product when a quantity of the negative information about the particular product exceeds a threshold amount.

13. The device of claim 8, wherein the one or more processors are further to:
   set controls on a transaction card of the customer for transactions with the merchant.

14. The device of claim 8, wherein the one or more processors are further to:
   receive, from one or more server devices associated with the merchant and based on the third-party boycott data, prior transaction data and transaction data,
      the prior transaction data associated with the merchant prior to the boycott,
      the prior transaction data indicating one or more of:
         historical quantities of products and services sold, or
         historical revenue received from sales of the products and the services,
      the transaction data associated with the merchant during the boycott, and
      the transaction data indicating one or more of:
         quantities of the products and services sold during the boycott, or
         revenue received from the sales of the products and services during the boycott; and
   determine an effect of sales of the products or the services of the merchant subject to the boycott based on the prior transaction data and the transaction data.

15. A non-transitory computer-readable medium storing instructions, the instructions comprising:
one or more instructions that, when executed by one or more processors of a device, cause the one or more processors to:
   receive customer preference data associated with a customer of a merchant and third-party boycott data associated with the merchant;
   process the third-party boycott data and the customer preference data, with a machine learning model trained using a particular feature set, to identify a boycott of the merchant that is predicted to be of interest to the customer,
      wherein the particular feature set is generated based at least in part by performing dimensionality reduction of historical third-party boycott data and historical customer preferences data, and wherein the machine learning model applies a classification technique to the particular feature set to determine an output to match boycotts of merchants to customers, of the merchants, that are predicted to have an interest in the boycotts;

determine that the customer desires to join the boycott;

receive transaction data associated with the boycott and associated with the merchant;

determine, based on the transaction data and determining that the customer desires to join the boycott, whether the boycott is an active boycott or a passive boycott, wherein the active boycott is associated with one or more customers of the merchant, and wherein the passive boycott is associated with one or more non-customers of the merchant; and perform one or more actions based on the transaction data and information indicating whether the boycott is the active boycott or the passive boycott.

16. The non-transitory computer-readable medium of claim 15, wherein the one or more instructions, that cause the one or more processors to perform the one or more actions, cause the one or more processors to:

prevent a transaction account from being used for a purchase from the merchant.

17. The non-transitory computer-readable medium of claim 15, wherein the one or more instructions, that cause the one or more processors to perform the one or more actions, cause the one or more processors to:

retrain the machine learning model based on one or more of:

the transaction data, information identifying the merchant, information identifying the customer, the information indicating that the customer desires to join the boycott, or the information identifying the boycott of the merchant.

18. The non-transitory computer-readable medium of claim 15, wherein the one or more instructions, that cause the one or more processors to receive the customer preference data, cause the one or more processors to:

receive information regarding an existing relationship between the customer and the merchant and information regarding one or more interests of the customer.

19. The non-transitory computer-readable medium of claim 15, wherein the one or more instructions, that cause the one or more processors to perform the one or more actions, cause the one or more processors to:

cause a transaction account of the customer to be restricted from a transaction with a supplier associated with the merchant.

20. The non-transitory computer-readable medium of claim 15, wherein the instructions further comprise:

track a quantity of customers that are boycotting the merchant based on the transaction data; and determine an effect of sales on the merchant based on the tracking the quantity of customers.

* * * * *